United States Patent
Funamoto et al.

(10) Patent No.: US 8,369,457 B2
(45) Date of Patent: Feb. 5, 2013

(54) DEMODULATION APPARATUS, DEMODULATION METHOD, AND ELECTRONIC DEVICE

(75) Inventors: Kazuhisa Funamoto, Kanagawa (JP); Kazukuni Takanohashi, Saitama (JP); Kazuhiro Oguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 324 days.

(21) Appl. No.: 12/886,934

(22) Filed: Sep. 21, 2010

(65) Prior Publication Data

US 2011/0090990 A1 Apr. 21, 2011

(30) Foreign Application Priority Data

Oct. 19, 2009 (JP) .................................. 2009-240054

(51) Int. Cl.
*H04L 27/00* (2006.01)

(52) U.S. Cl. .......... 375/324; 375/322; 375/316; 375/219
(58) Field of Classification Search .................. 375/324, 375/322, 316, 219
See application file for complete search history.

(56) References Cited

U.S. PATENT DOCUMENTS

2006/0038024 A1* 2/2006 Nakadai et al. ............... 235/492

* cited by examiner

*Primary Examiner* — Zewdu Kassa
(74) *Attorney, Agent, or Firm* — Oblon, Spivak, McClelland, Maier & Neustadt, L.L.P.

(57) ABSTRACT

Disclosed herein is a demodulation apparatus including: an operation determination block configured to determine whether the demodulation apparatus operates as part of either a first device or a second device with which the demodulation apparatus communicates, the first device being configured to ASK-modulate and transmit data, the second device being configured to load-modulate and transmit data; and first and second demodulation control blocks.

8 Claims, 7 Drawing Sheets

DEMODULATION APPARATUS, DEMODULATION METHOD, AND ELECTRONIC DEVICE

BACKGROUND OF THE INVENTION

1. Field of the Invention

The present invention relates to a demodulation apparatus, a demodulation method, and an electronic device. More particularly, the invention relates to a demodulation apparatus, a demodulation method, and an electronic device for resolving the problem of a so-called null state thereby enhancing the accuracy of demodulation independent of the reception environment.

2. Description of the Related Art

Recent years have witnessed widespread acceptance of noncontact IC cards (e.g., FeliCa (registered trademark)). A variety of demodulation methods have been proposed for communication using such IC cards.

Ordinary noncontact IC card reader/writers have experienced the following problem regarding the demodulation of a transmitted signal load-modulated by a noncontact IC card: upon load modulation, the so-called null state can occur if there is a particular distance between the noncontact IC card and the reader/writer. The null state is a state where communication is not established due to the inability to demodulate the received signal. This state is brought about when there is no amount of change in the direction of amplitude whereas there exists an amount of change in the phase direction.

One proposed method of countering the problem above involves supplementing an ordinary amplitude change detector with a phase change detection circuit so that one of the outputs from these two types of circuits may be selected (e.g., see Japanese Patent Laid-Open No. 2009-118070; called Patent Document 1 hereunder). In determining the output to be selected, the technique proposed by Patent Document 1 references a transmission channel code (sync code) and the result of an average amplitude level having been calculated.

More specifically, digital demodulators described in Patent Document 1 each include a transmission channel code detection circuit and an average amplitude level calculation circuit in addition to circuits for performing demodulation and bit decoding. Detection signals coming from the transmission channel code detection circuit and the average amplitude level calculation circuit are used by a controller in selecting one of output signals from the digital demodulators. The output signal thus selected is fed to an output selector. Based on the selection signal from the controller, the output selector selects and outputs one of the demodulated signals coming from the digital demodulators.

According to Patent Document 1, the selective demodulation process outlined above permits demodulation in the null state.

SUMMARY OF THE INVENTION

However, as long as the technique of Patent Document 1 involves making the selection based on the received signal, the accuracy of the selection is dependent on the reception environment. Illustratively in the case of a poor reception environment, the demodulation itself may be carried out correctly but the selection process can be inaccurate. As a result, the demodulation process may not be performed properly.

For these reasons, the ordinary techniques have failed to improve the accuracy of demodulating the received signal independent of the reception environment.

The present invention has been made in view of the above circumstances and provides arrangements for resolving the problem of the null state thereby enhancing the accuracy of demodulation independent of the reception environment.

In carrying out the present invention and according to one embodiment thereof, there is provided a demodulation apparatus including: an operation determination block configured to determine whether the demodulation apparatus operates as part of either a first device or a second device with which the demodulation apparatus communicates, the first device being configured to ASK-modulate and transmit data, the second device being configured to load-modulate and transmit data; a first demodulation control block configured such that if the demodulation apparatus is determined to operate as part of the first device, then the first demodulation control block detects a phase change of a transmitted signal generated by the second device on the basis of an in-phase signal and an orthogonal signal obtained by orthogonally detecting the transmitted signal, the first demodulation control block further demodulating data sent from the second device on the basis of the detected phase change; and a second demodulation control block configured such that if the demodulation apparatus is determined to operate as part of the second device and if the communication scheme of the first device is estimated to be a predetermined communication scheme, then the second demodulation control block detects an amplitude change of a transmitted signal generated by the first device on the basis of a detection signal obtained by envelope-detecting the transmitted signal, the second demodulation control block further demodulating data sent from the second device on the basis of the detected amplitude change.

Preferably, if the demodulation apparatus is determined to operate as part of the second device and if the communication scheme of the first device is estimated to be other than the predetermined communication scheme, then the first demodulation control block may detect the amplitude change of the transmitted signal on the basis of either the in-phase signal or the orthogonal signal, the first demodulation control block further demodulating the data sent from the second device on the basis of the detected amplitude change.

Preferably, the first demodulation control block may include: an orthogonal detection block configured to output the in-phase signal and the orthogonal signal obtained by orthogonally detecting the transmitted signal; an A/D conversion block configured to output two digital signals by A/D-converting the in-phase signal and the orthogonal signal; and a first digital demodulation block configured to demodulate the data sent from the second device on the basis of the two digital signals; and the second demodulation control block may include: an envelope detection block configured to output the detection signal obtained by envelope-detecting the transmitted signal; an A/D conversion block configured to output a digital signal by A/D-converting the detection signal; and a second digital demodulation block configured to demodulate the data sent from the second device on the basis of the digital signal.

Preferably, the predetermined demodulation scheme may be the Type A communication standard stipulated by ISO/IEC 14443.

According to another embodiment of the present invention, there is provided a demodulation method for use with a demodulation apparatus including an operation determination block, a first demodulation control block and a second demodulation control block, the demodulation method including the steps of: causing the operation determination block to determine whether the demodulation apparatus operates as part of either a first device or a second device with which the demodulation apparatus communicates, the first device being configured to ASK-modulate and transmit data, the second device being configured to load-modulate and transmit data; if the demodulation apparatus is determined to operate as part of the first device, then causing the first demodulation control block to detect a phase change of a transmitted signal generated by the second device on the basis of an in-phase signal and an orthogonal signal obtained by orthogonally detecting the transmitted signal, the first demodulation control block being further caused to demodulate data sent from the second device on the basis of the detected phase change; and if the demodulation apparatus is determined to operate as part of the second device and if the communication scheme of the first device is estimated to be a predetermined communication scheme, then causing the second demodulation control block to detect an amplitude change of a transmitted signal generated by the first device on the basis of a detection signal obtained by envelope-detecting the transmitted signal, the second demodulation control block being further caused to demodulate data sent from the second device on the basis of the detected amplitude change.

According to a further embodiment of the present invention, there is provided an electronic device including a demodulation apparatus that includes: an operation determination block configured to determine whether the demodulation apparatus operates as part of either a first device or a second device with which the demodulation apparatus communicates, the first device being configured to ASK-modulate and transmit data, the second device being configured to load-modulate and transmit data; a first demodulation control block configured such that if the demodulation apparatus is determined to operate as part of the first device, then the first demodulation control block detects a phase change of a transmitted signal generated by the second device on the basis of an in-phase signal and an orthogonal signal obtained by orthogonally detecting the transmitted signal, the first demodulation control block further demodulating data sent from the second device on the basis of the detected phase change; and a second demodulation control block configured such that if the demodulation apparatus is determined to operate as part of the second device and if the communication scheme of the first device is estimated to be a predetermined communication scheme, then the second demodulation control block detects an amplitude change of a transmitted signal generated by the first device on the basis of a detection signal obtained by envelope-detecting the transmitted signal, the second demodulation control block further demodulating data sent from the second device on the basis of the detected amplitude change; wherein the electronic device demodulates a transmitted signal from another device using the demodulation apparatus.

According to the embodiments of the present invention, it is determined whether the demodulation apparatus operates as part of either a first device or a second device with which the demodulation apparatus communicates, the first device ASK-modulating and transmitting data, the second device load-modulating and transmitting data. If the demodulation apparatus is determined to operate as part of the first device, then a phase change of a transmitted signal generated by the second device is detected on the basis of an in-phase signal and an orthogonal signal obtained by orthogonally detecting the transmitted signal. Data sent from the second device is demodulated on the basis of the detected phase change. If the demodulation apparatus is determined to operate as part of the second device and if the communication scheme of the first device is estimated to be a predetermined communication scheme, then an amplitude change of a transmitted signal generated by the first device is detected on the basis of a detection signal obtained by envelope-detecting the transmitted signal. Data sent from the second device is demodulated on the basis of the detected amplitude change.

According to the embodiments of the present invention, as outlined above, the problem of the null state is resolved so that the accuracy of demodulation is improved independent of the reception environment.

DETAILED DESCRIPTION OF THE PREFERRED EMBODIMENTS

Figure 1:
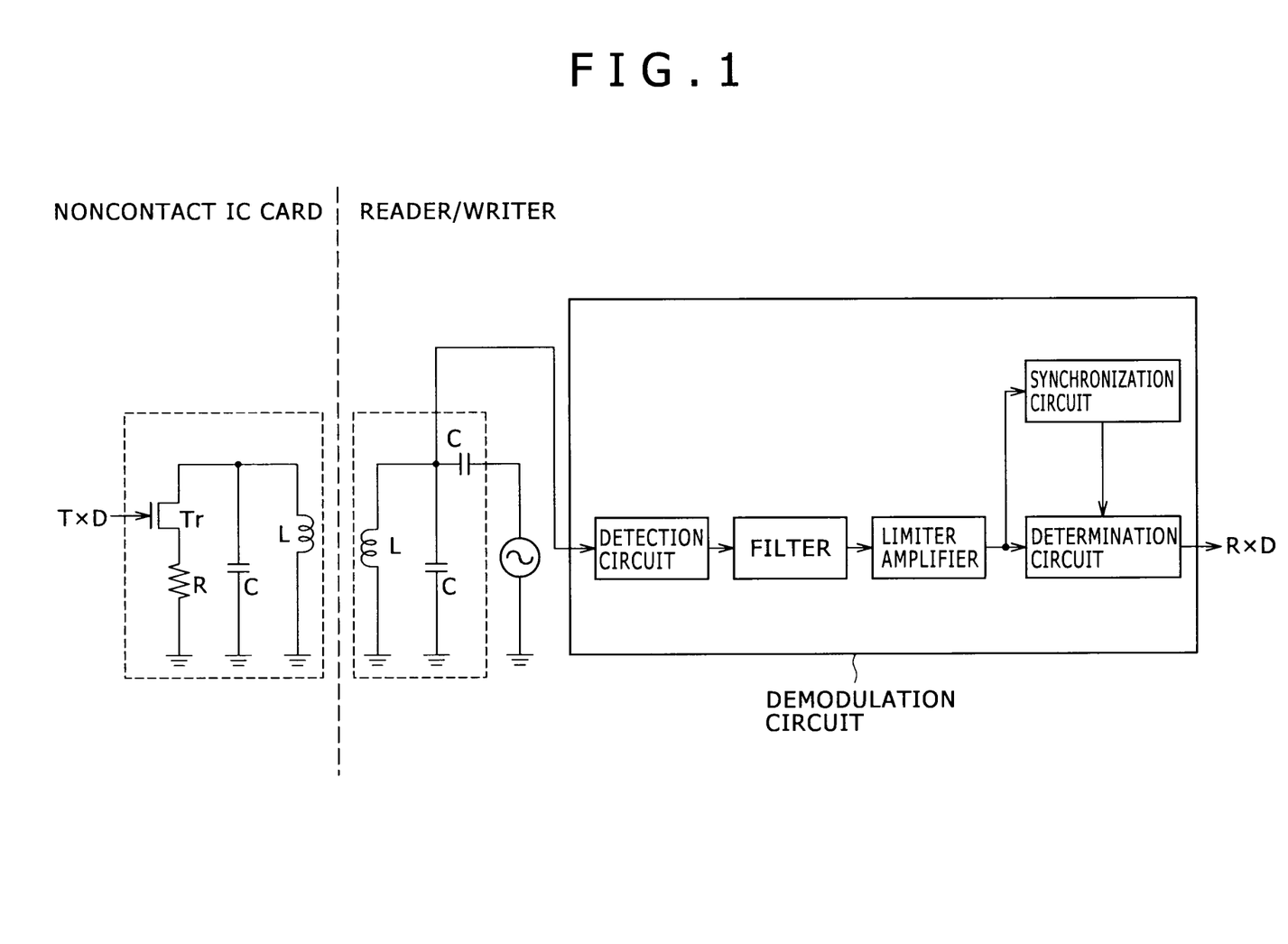
FIG. 1 is a block diagram showing a schematic configuration of a noncontact IC card and a reader/writer.

Some preferred embodiments of the present invention will now be described in reference to the accompanying drawings. Explained first is how communication takes place between a noncontact IC card and a reader/writer. FIG. 1 is a block diagram showing a schematic configuration of the noncontact IC card and the reader/writer. The noncontact IC card in FIG. 1 is shown to have only an antenna circuit and a load modulation circuit; demodulation and control blocks are not shown. The noncontact IC card has its antenna circuit composed of a parallel oscillation circuit including a coil L and a capacitor C. The load modulation circuit is made up of a switch element Tr and a resistor R.

The reader/writer has an antenna circuit constituted by a parallel oscillation circuit including a coil L and a capacitor C and by another capacitor C. A modulated signal generation circuit is connected in parallel with this antenna circuit. The modulated signal generation circuit is a circuit block that generates an ASK (amplitude shift keying) modulated signal to be transmitted to the noncontact IC card by this reader/writer. Illustratively, the modulated signal generation circuit ASK-modulates a carrier signal having a frequency of 13.56 MHz on the basis of the data to be transmitted.

The antenna circuit is also connected with a demodulation circuit made up of a detection circuit, a filter, a limiter amplifier, a synchronization circuit, and a determination circuit.

Between the noncontact IC card and reader/writer outlined above, communication takes place as follows: the reader/writer outputs a modulated signal having the frequency of 13.56 MHz generated by the modulated signal generation circuit via the antenna circuit by radio waves. The noncontact IC card receives via its antenna circuit the radio waves sent from the reader/writer. The ASK-modulated signal is then demodulated into a digital signal by a demodulation circuit, not shown, before being forwarded to a control circuit, also not shown.

The noncontact IC card transmits its signal to the reader/writer as follows: the control circuit of the noncontact IC card gives a transmitted signal TxD to a switch element Tr to turn it on/off. Turning on/off the switch element Tr changes the value of load resistance. This is how the noncontact IC card load-modulates the carrier signal sent from the reader/writer. For its part, the reader/writer detects the load-modulated signal as transmitted information from the noncontact IC card. The demodulation circuit of the reader/writer demodulates the load-modulated signal.

When the transmitted signal load-modulated by the noncontact IC card is being received and demodulated by the reader/writer, a so-called null state may occur if there is a particular distance between the noncontact IC card and the reader/writer. The null state is a state in which there is no amount of change in the direction of amplitude whereas there exists an amount of change in the phase direction. In the null state, the received signal cannot be demodulated and thus communication is disabled.

Figure 2:
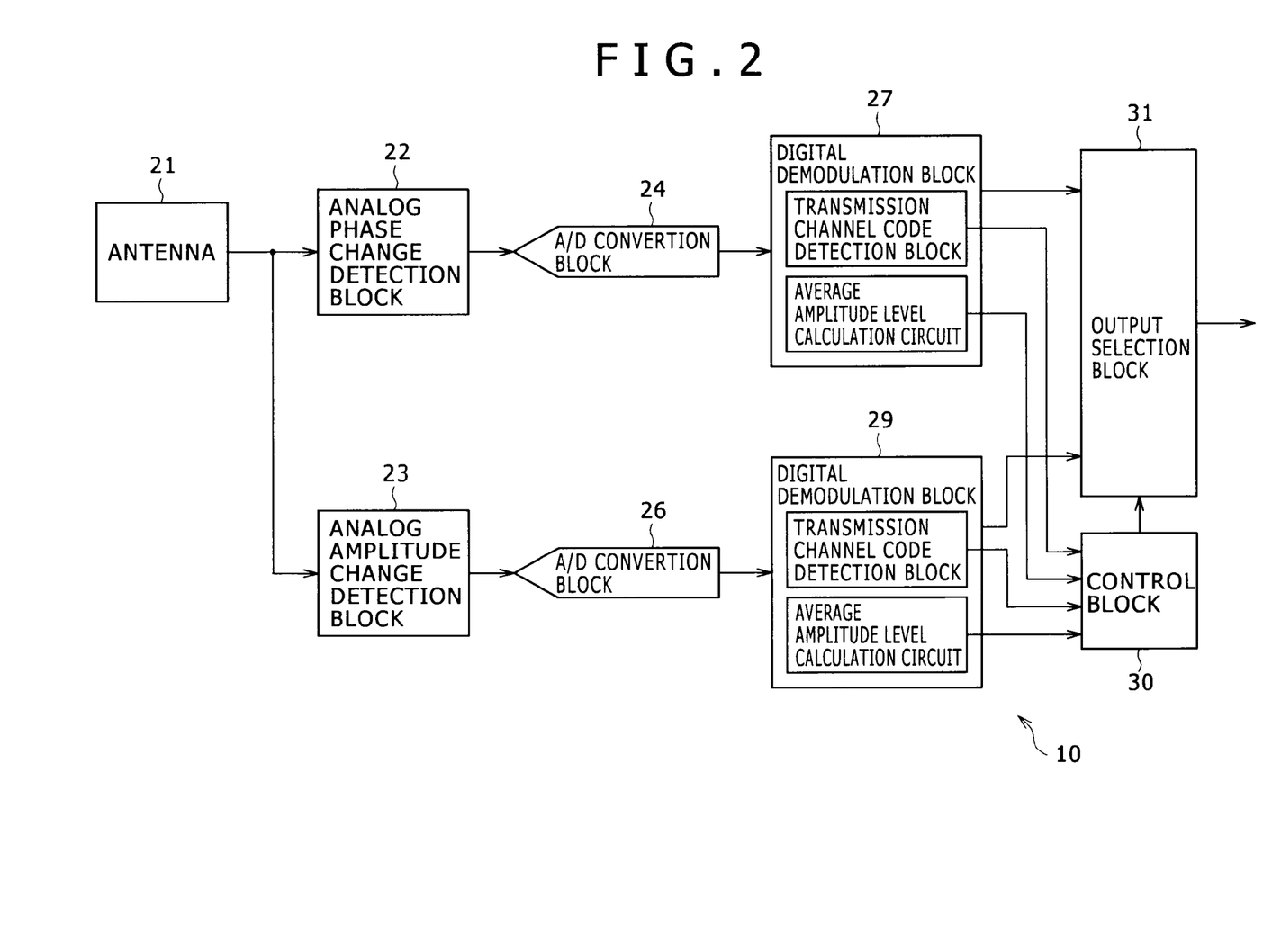
FIG. 2 is a block diagram showing a typical structure of an ordinary demodulation function block.

In order to bypass the failure of communication in the null state, the demodulation function block such as one whose structure is shown in FIG. 2 has been proposed. The demodulation function block 10 in FIG. 2 is illustratively mounted on the noncontact IC card or on the reader/writer corresponding to the noncontact IC card.

The demodulation function block 10 may function either as part of the noncontact IC card or as part of the reader/writer. For example, if mounted on an electronic device such as a mobile phone, the demodulation function block 10 under control of the electronic device operates either as part of the noncontact IC card or as part of the reader/writer.

The signal received by an antenna 21 shown in FIG. 2 is sent to an analog phase change detection block 22 for phase detection, whereby a phase change signal is detected.

The analog phase change detection block 22 is illustratively constituted by an analog orthogonal detector. The analog orthogonal detector typically supplies a first and a second multiplier with the signal received via the antenna 21. The first multiplier multiplies the signal received via the antenna 21 by the output of an oscillator. The result of the multiplication is passed through a high-pass filter and a low-pass filter so as to acquire an in-phase signal that is output. The second multiplier multiplies the signal received via the antenna 21 by a signal obtained by passing the output of the oscillator through a $\pi/2$ (=90°) phase shifter. The result of this multiplication is passed through the high-pass filter and low-pass filter to acquire an orthogonal signal that is output. A phase change is then detected on the basis of the in-phase signal and orthogonal signal output as described above.

The signal received by the antenna 21 in FIG. 2 is also sent to an analog amplitude change detection block 23 for amplitude detection, whereby an amplitude change signal is detected.

The analog amplitude change detection block 23 is typically composed of an analog synchronous detector. Illustratively, the analog synchronous detector multiplies the signal received via the antenna 21 by the output of an oscillator to obtain a baseband signal. The analog synchronous detector then detects an amplitude change of the baseband signal thus acquired.

The analog amplitude change detection block 23 is also formed illustratively by an analog envelope detector. For example, the analog envelope detector envelope-detects the signal received via the antenna 21, thereby detecting an amplitude change.

An A/D conversion block 24 samples the phase change signal detected by the analog phase change detection block 22 for conversion into a digital signal, and an A/D conversion block 26 samples the amplitude change signal detected by the analog amplitude change detection block 23 for conversion into a digital signal. The digital signals output from the A/D conversion blocks 24 and 26 are fed to digital demodulation blocks 27 and 29, respectively.

The digital demodulation blocks 27 and 29 each have a transmission channel code detection circuit and an average amplitude level calculation circuit in addition to circuits for performing a demodulation process and bit decoding. The result of the detection by the transmission channel code detection circuit and the result of the calculation by the average amplitude level calculation circuit are both sent to a control block 30.

The control block 30 determines (i.e., selects) the signal to be output from the demodulation function block 10 based on the result of the detection by the transmission channel code detection circuit and on the result of the calculation by the average amplitude level calculation circuit. That is, the control block 30 determines if the output signal from the digital demodulation block 27 or the output signal from the digital demodulation block 29 is the signal to be output from the demodulation function block 10.

On the basis of the result of the determination by the control block 30, an output selection block 31 selects either the output signal from the digital demodulation block 27 or the output signal from the demodulation block 29, and causes the demodulation function block 10 to output the selected signal.

Illustratively on the basis of the result of the calculation by the average amplitude level calculation circuit, the control block 30 generates a control signal and sends it to the output selection block 31 causing the latter to select the output signal having the higher average amplitude level of the two. That is, the percentage of correct selections is improved by use of information about the magnitude of the average amplitude level in addition to information about whether a transmission channel code has been successfully detected.

In the manner described above, the demodulation function block 10 can usually demodulate the data sent from the noncontact IC card on the basis of the amount of change in the amplitude direction detected by the analog amplitude change detection block 23. In the null state, the demodulation function block 10 can demodulate the data coming from the noncontact IC card on the basis of the amount of change in the phase direction detected by the analog phase change detection block 22.

When the null state is encountered, the demodulation function block 10 selects either the amount of change in the amplitude direction or the amount of change in the phase direction for demodulation processing. This enables the demodulation function block 10 to permit communication between the noncontact IC card and the reader/writer in the null state.

However, as long as the demodulation function block 10 makes its selections based on the received signal, the accuracy of the selection process is dependent on the reception environment. Thus in a poor reception environment, the demodulation itself may be successfully performed but the selection process may not be carried out properly. As a result, the demodulation may turn out to be unsuccessful.

According to an embodiment of the present invention, by contrast, the determination (i.e., selection) made by the control block 30 of the demodulation function block 10 as discussed above is not performed. That is, the selection based on the magnitude of the average amplitude level is not carried out.

Figure 3:
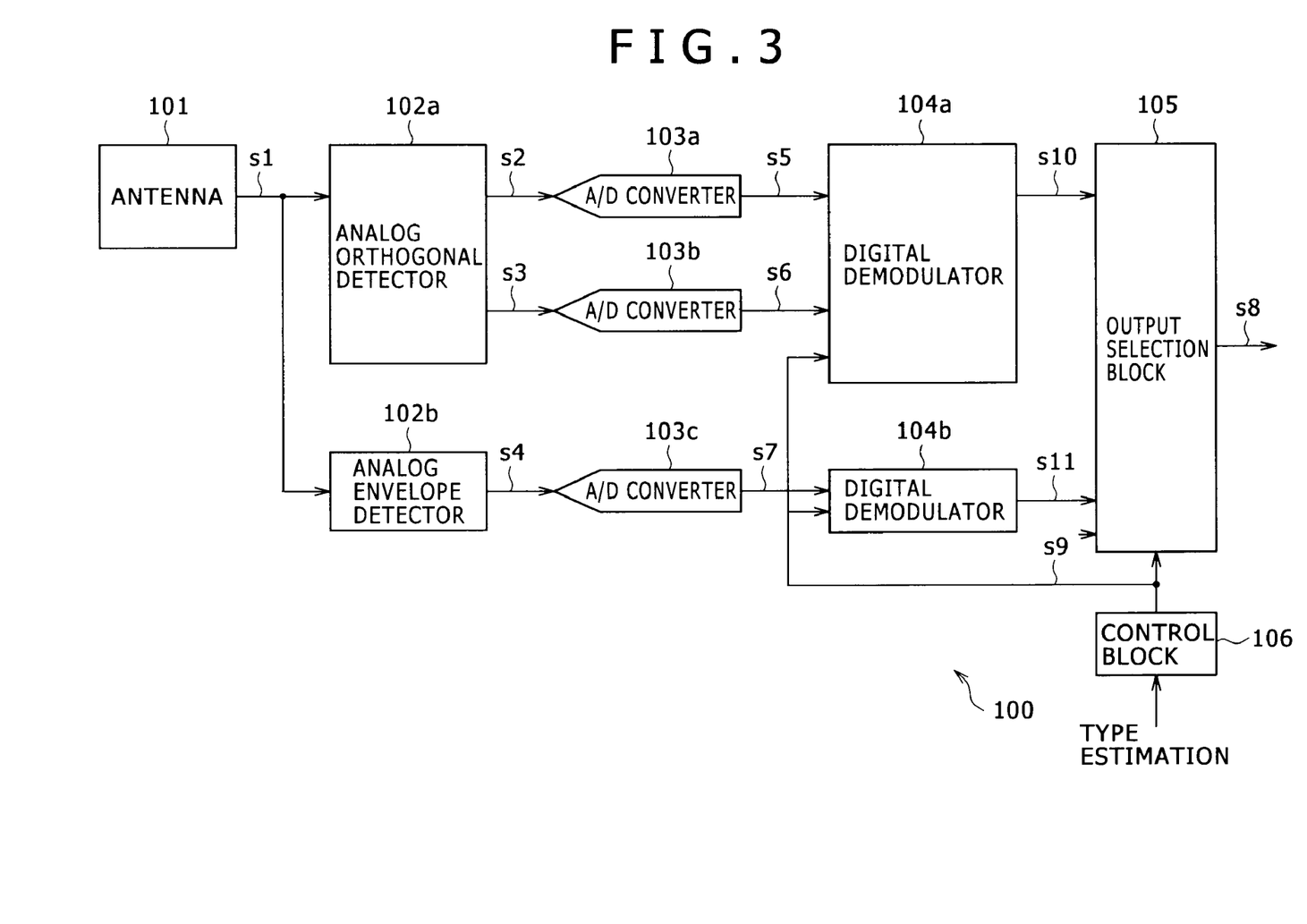
FIG. 3 is a block diagram showing a typical structure of a demodulation function block as one embodiment of the present invention.

FIG. 3 is a block diagram showing a typical structure of a demodulation function block 100 as one embodiment of the present invention. The demodulation function block 100 in FIG. 3 is mounted illustratively on the noncontact IC card or on the reader/writer corresponding to the noncontact IC card.

The demodulation function block 100 may operate as a demodulation function block of either the noncontact IC card or the reader/writer. Illustratively, if mounted on an electronic device such as a mobile phone, the demodulation function block 100 under control of the electronic device operates either as the demodulation function block of the noncontact IC card or as the demodulation function block of the reader/writer.

The demodulation function block 100 in FIG. 3 includes an antenna 101, an analog orthogonal detector 102a, an analog envelope detector 102b, A/D converters 103a through 103c, a digital demodulator 104a, and a digital demodulator 104b. The demodulation function block 100 also has an output selection block 105 and a control block 106.

A signal s1 received by the antenna 101 in FIG. 3 is supplied to the analog orthogonal detector 102a. The analog orthogonal detector 102 subjects the supplied signal to phase detection, whereby a phase change signal is output as signals s2 and s3.

Figure 4:
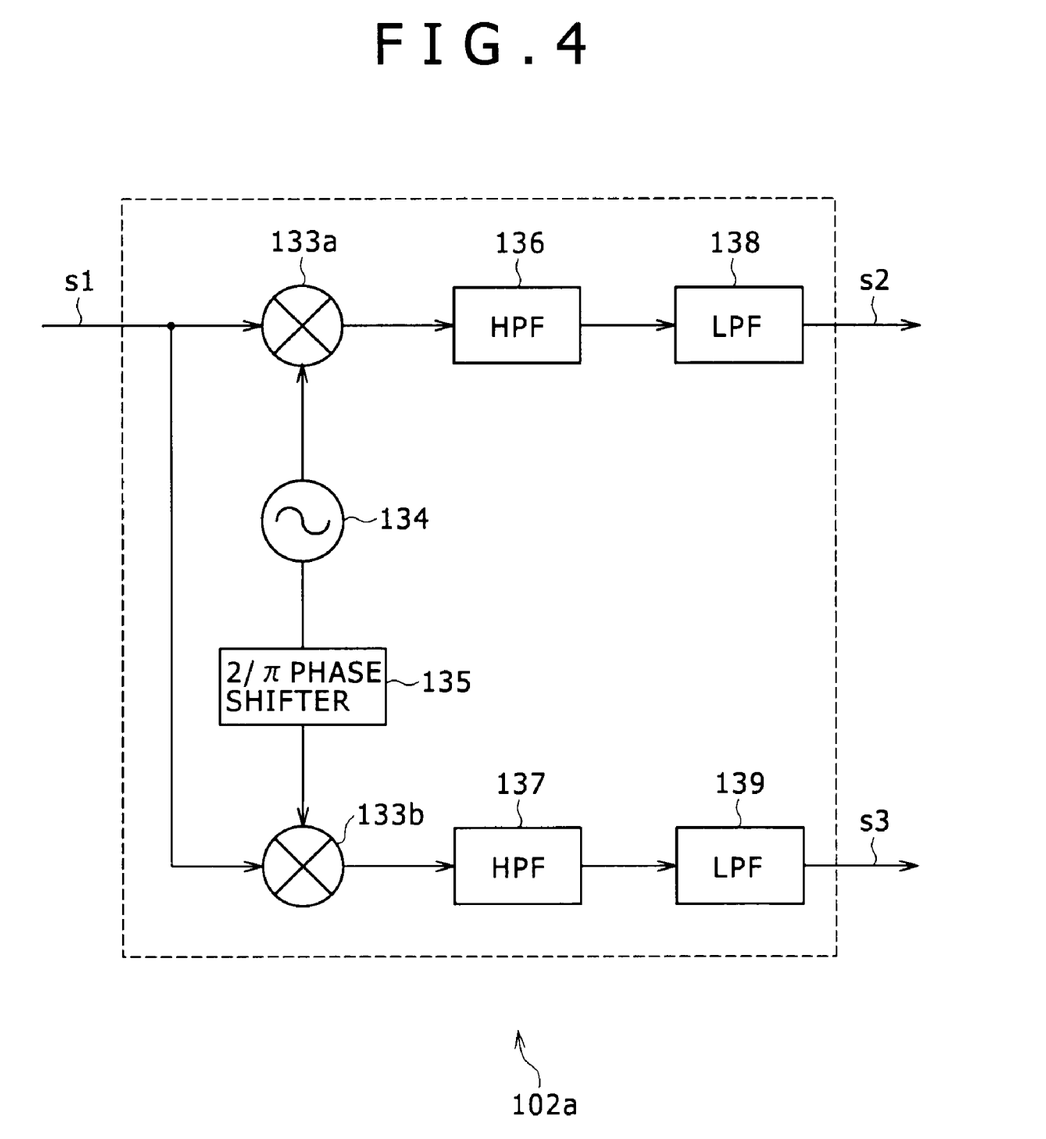
FIG. 4 is a block diagram showing a detailed structure of an analog orthogonal detector included in FIG. 3.

FIG. 4 is a block diagram showing a detailed structure of the analog orthogonal detector 102a. As illustrated, the analog orthogonal detector 102a includes multipliers 133a and 133b, an oscillator 134, and a π/2 (=90°) phase shifter 135. The analog orthogonal detector 102a also has high-pass filters (HPF) 136 and 137 and low-pass filters (LPF) 138 and 139.

The signal s1 supplied to the analog orthogonal detector 102a is input to the multipliers 133a and 133b. The multiplier 133a multiplies the signal s1 by a signal output from the oscillator 134. The multiplier 133b multiplies the signal s1 by a signal obtained by shifting the signal output from the oscillator 134 by 90 degrees.

The signal output from the multiplier 133a is passed through the high-pass filter 136 and low-pass filter 138 before being output as the signal s2. The signal s2 is an in-phase signal. The signal output from the multiplier 133b is passed through the high-pass filter 137 and low-pass filter 139 before being output as the signal s3. The signal s3 is an orthogonal signal.

A phase change can then be detected on the basis of the in-phase signal (signal s2) and orthogonal signal (signal s3) output as described above. The signal s2 (or signal s3) output from the analog orthogonal detector 102a may also be used as a baseband signal prior to modulation regarding the signal s1.

Returning to FIG. 3, the signal s1 received by the antenna 101 is also fed to the analog envelope detector 102b. The analog envelope detector 102b subjects the supplied signal to envelope detection, whereby an amplitude change signal is output as a signal s4. The analog envelope detector 102b envelope-detects the signal s1 modulated by the carrier, thereby detecting the amplitude change.

The A/D converters 103a and 103b sample respectively the signals s2 and s3 at predetermined sampling rates to generate digital signals s5 and s6. The signals s5 and s6 thus generated are sent to the digital demodulator 104a.

The A/D converter 103c samples the signal s4 at a predetermined sampling rate to generate a digital signal s7. The signal s7 thus generated is forwarded to the digital demodulator 104b.

The digital demodulator 104a under control of the control block 106 performs demodulation in accordance with the signals s5 and s6. When carrying out demodulation in first mode, the digital demodulator 104a detects a phase change based on the signals s5 and s6. On the basis of the detected phase change, the digital demodulator 104a demodulates data sent from the communicating party. The first mode of the digital demodulator 104a is called phase change demodulation mode hereunder.

When performing demodulation in second mode, the digital demodulator 104a detects an amplitude change based on the signal s5. On the basis of the detected amplitude change, the digital demodulator 104a demodulates data sent from the communicating party. The second mode of the digital demodulator 104a is called amplitude change demodulation mode hereunder. When operating in amplitude change demodulation mode, the digital demodulator 104a may alternatively detect an amplitude change based on the signal s6 and, on the basis of the detected amplitude change, demodulate data sent from the communicating party. In the ensuing description, there will be explained an example in which an amplitude change is detected based on the signal s5.

The digital demodulator 104b detects an amplitude change based on the signal s7. On the basis of the detected amplitude change, the digital demodulator 104b demodulates data sent from the communicating party.

Under control of the control block 106, the output selection block 105 selectively outputs an input signal. That is, the output selection block 105 selects either a signal s10 output by the digital demodulator 104a as a result of its demodulation or a signal s11 output by the digital demodulator 104b as a result of its demodulation. The selected signal is output as a signal s8.

The signal s8 is sent illustratively to a microcomputer of an electronic device incorporating the demodulation function block 100 (e.g., mobile phone). The signal s8 is used typically for handling transactions between the noncontact IC card and the reader/writer.

The control block 106 outputs control signals for operating the digital demodulators 104a and 104b, as well as control signals for determining the signal to be output from the output selection block 105.

The transmitted signal load-modulated by the noncontact IC card necessarily has a reduced degree of modulation compared with the transmitted signal ASK-modulated by the reader/writer. Thus if the demodulation function block 100 is mounted on the reader/writer, the signal s1 received by the antenna 101 constitutes a load-modulated signal having a reduced amplitude.

Where the amplitude of the signal s1 is limited as described, a null state can frequently occur depending on the distance between the noncontact IC card and the reader/writer. In the null state, as discussed above, there is no amount of change in the direction of amplitude whereas there exists an amount of change in the phase direction. For this reason, reliability is not high for the data demodulated on the basis of the signal s4 as the detection signal of the analog envelope detector 102b.

Meanwhile, an amount of change still exists in the phase direction in the null state. Thus reliability is high for the data demodulated on the basis of the signals s2 and s3 as the detection signals of the analog orthogonal detector 102a.

For the reasons above, where the demodulation function block 100 is mounted on the reader/writer, it is preferred to operate the digital demodulator 104a in phase change demodulation mode for demodulation purposes and to output selectively the signal s10 as the result of the demodulation.

The transmitted signal ASK-modulated by the reader/writer necessarily has a high degree of modulation. Thus if the demodulation function block 100 is mounted on the noncontact IC card, then the signal s1 received by the antenna 101 has a large amplitude. As long as the amplitude of the signal s1 is large, the null state is generally not encountered. Where the demodulation function block 100 is mounted on the noncontact IC card, reliability is high for the data demodulated on the basis of the detection signal having an amplitude change.

If the transmitted signal ASK-modulated by the reader/writer does not have a sufficiently high degree of modulation, there is a possibility that an amplitude change of the transmitted signal may be falsely detected typically due to the presence of noise. For example, ISO/IEC 14443 as an international standard regarding the communication techniques such as those for noncontact IC cards stipulates two communication systems: Type A and Type B. The degree of modulation is 100 percent for Type A while 8 to 14 percent for Type B.

If the demodulation function block 100 is mounted on the noncontact IC card and if Type A communication is effected, then reliability is high for the data demodulated on the basis of the signal s4 as the detection signal of the analog envelope detector 102b. That is because the transmitted signal ASK-modulated by the reader/writer has a sufficiently high degree of modulation in Type A communication.

However, if the demodulation function block 100 is mounted on the noncontact IC card and if Type B communication is effected, then reliability is not high for the data demodulated on the basis of the signal s4 as the detection signal of the analog envelope detector 102b. The transmitted signal ASK-modulated by the reader/writer does not have a sufficiently high degree of modulation in Type B communication, so that an amplitude change of the transmitted signal may be falsely detected typically due to the presence of noise.

Furthermore, there occurs a phase difference between an in-phase signal and an orthogonal signal obtained by orthogonally detecting the transmitted signal ASK-modulated by the reader/writer. That is, if the demodulation function block 100 is mounted on the noncontact IC card and if Type B communication is in effect, it is difficult to detect a phase change because of the phase difference taking place between the signals s5 and s6 output from the analog orthogonal detector 102a. In this case, it is not desirable to operate the digital demodulator 104a in phase change demodulation mode for demodulation purposes.

Thus where the demodulation function block 100 is mounted on the noncontact IC card and where Type B communication is performed, the digital demodulator 104a is arranged to operate in amplitude change demodulation mode for carrying out demodulation. As discussed above, when performing demodulation in amplitude change demodulation mode, the digital demodulator 104a detects an amplitude change based on the signal s5 and, on the basis of the detected amplitude change, demodulates data sent from the communicating party. Thus upon carrying out demodulation in amplitude change demodulation mode, the digital demodulator 104a can perform detection in the same manner as an analog synchronous detector, detecting the amplitude change of the baseband signal.

As described, in the case of Type B communication where the transmitted signal ASK-modulated by the reader/writer does not have a sufficiently high degree of modulation, it is still possible to prevent a decline in the reliability of the result of demodulation because of false detection of an amplitude change in the transmitted signal typically due to the presence of noise.

In the case of Type A communication where the transmitted signal ASK-modulated by the reader/writer has a sufficiently high degree of modulation, reliability is higher for the data demodulated on the basis of the signal s4 as the detection signal of the analog envelope detector 102b than for the data demodulated by the digital demodulator 104a operating in amplitude change demodulation mode.

According to an embodiment of the present invention, the control block 106 determines whether the demodulation function block 100 is mounted on the noncontact IC card or on the reader/writer. If the demodulation function block 100 is mounted on an electronic device such as a mobile phone, the control block 106 determines whether the demodulation function block 100 functions either as the demodulation function block of the noncontact IC card or as the demodulation function block of the reader/writer.

That is, the control block 106 can check to determine whether the demodulation function block operates as part of the reader/writer or as part of the noncontact IC card.

The control block 106 proceeds to determine the communication standard in effect based on the result of type estimation performed by a type estimation block, not shown. Illustratively, the type estimation block estimates the communication standard such as Type A or Type B mentioned above on the basis of the result of first signals being exchanged between the noncontact IC card and the reader/writer. The type estimation block then outputs the result of the estimation.

If the demodulation function block 100 is determined to be operating as part of the reader/writer, the control block 106 causes the digital demodulator 104a to perform demodulation in phase change demodulation mode, and allows the output selection block 105 selectively to output the signal s10.

If the demodulation function block 100 is determined to be active as part of the noncontact IC card, the control block 106 further determines the result of the type estimation. If the result of the type estimation is determined to be Type A, the control block 106 causes the digital demodulator 104b to perform demodulation and allows the output selection block 105 selectively to output the signal s11. If the result of the type estimation is determined to be Type B, then the control block 106 causes the digital demodulator 104a to perform demodulation in amplitude change demodulation mode and allows the output selection block 105 selectively to output the signal s10.

As described, the demodulation function block 100 of the present invention can demodulate the transmitted signal using not only the demodulation scheme based on amplitude change but also the demodulation scheme based on phase change. This enables the demodulation function block 100 to resolve the problem of the null state. In this case, the demodulation scheme is not selected by detecting illustratively the magnitude of amplitude of the signal s1. That is, the demodulation function block 100 of the present invention selects the demodulation scheme based on the result of the determination as to whether the reader/writer or the noncontact IC card is in use and also on the basis of the result of the type estimation.

Ordinarily, the demodulation scheme was selected typically on the basis of the magnitude of amplitude of the received signal in order to resolve the problem of the null state. Thus there has been a possibility that although the demodulation itself is performed properly in a poor reception environment, the selection process is not carried out appropriately thereby preventing the eventual demodulation from being effected successfully. With the existing techniques in use, it was difficult to improve the accuracy of demodulating the received signal independent of the reception environment.

According to an embodiment of the present invention, by contrast, the demodulation scheme is selected regardless of the magnitude of amplitude of the signal s1. This makes it possible to enhance the accuracy of demodulation independent of the reception environment.

Figure 5:
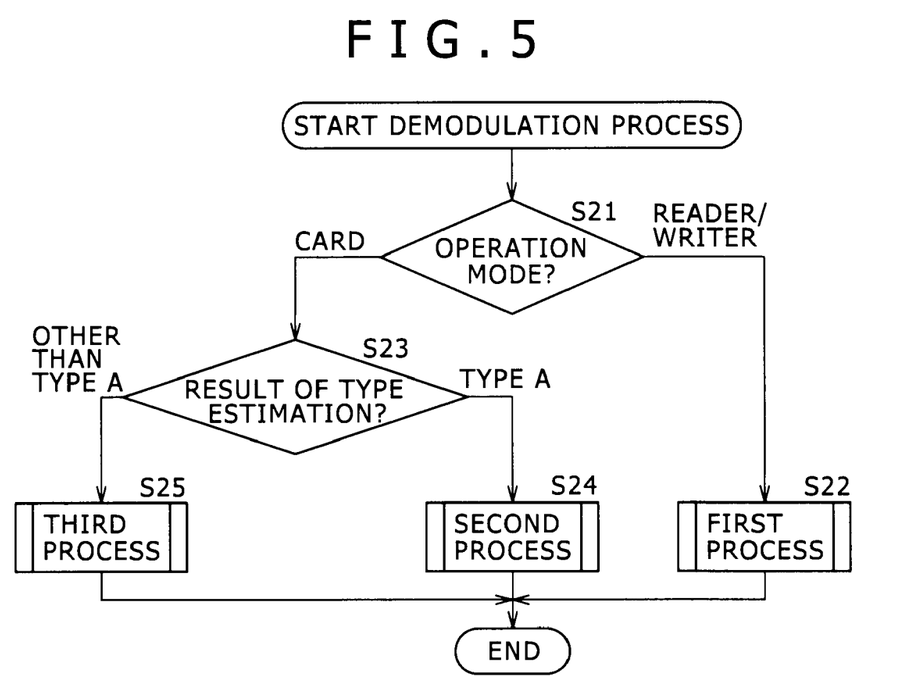
FIG. 5 is a flowchart explanatory of a typical demodulation process.

Described below in reference to the flowchart of FIG. 5 is a typical demodulation process performed by the demodulation function block 100 of the present invention. In step S21, the control block 106 determines an operation mode of the demodulation function block 100. It is assumed that the demodulation function block 100 works in one of two modes: reader/writer mode in which the demodulation function block 100 operates as part of the reader/writer, or card mode in which the demodulation function block 100 functions as part of the noncontact IC card.

If in step S21 the operation mode of the demodulation function block 100 is determined to be reader/writer mode, then control is passed on to step S22. In step S22, a first process is carried out.

Figure 6:
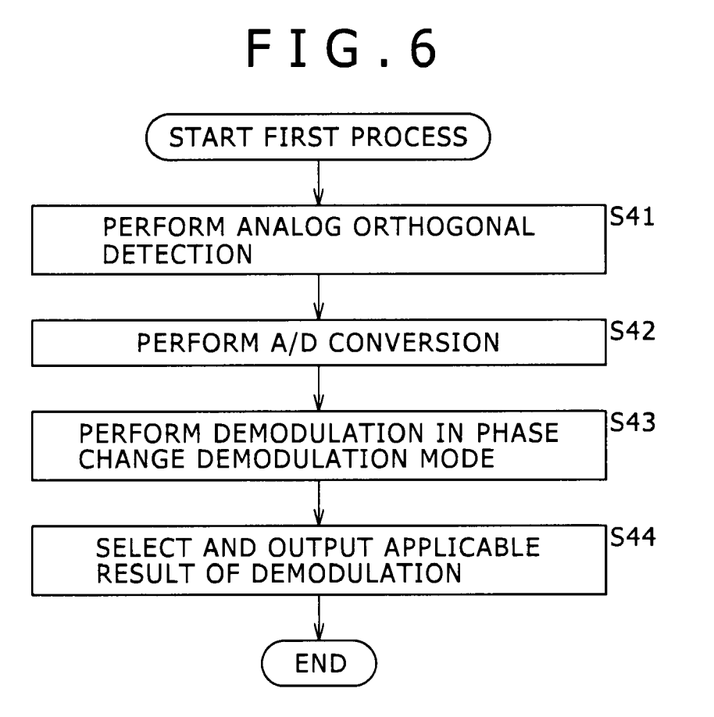
FIG. 6 is a flowchart explanatory of a detailed example of a first process included in FIG. 5.

The first process in step S22 of FIG. 5 is explained below in detail by referring to the flowchart of FIG. 6. In step S41, the analog orthogonal detector 102a subjects the signal s1 to analog orthogonal detection. At this point, the analog orthogonal detector 102a phase-detects the supplied signal and outputs its phase change signal as the signals s2 and s3. At the same time, the analog envelope detector 102b envelope-detects the signal s1 so as to detect an amplitude change.

In step S42, the A/D converters 103a and 103b A/D-convert the signals s2 and s3, respectively, which are output as a result of the processing in step S41. The A/D conversion generates the signals s5 and s6 as digital signals.

In step S43, the digital demodulator 104a performs demodulation in phase change demodulation mode based on the signals s5 and s6. The digital demodulator 104s outputs the signal s10 as the result of the demodulation.

In step S44, the output selection block 105 selects the result of the demodulation, i.e., signal s10, and outputs the selected signal as the signal s8. This is how the first process is carried out.

Returning to FIG. 5, if in step S21 the operation mode of the demodulation function block 100 is determined to be card mode, then control is passed on to step S23. In step S23, the control block 106 determines the result of type estimation performed by the type estimation block.

If in step S23 the result of the type estimation is determined to be Type A, then control is passed on to step S24. In step S24, a second process is carried out.

Figure 7:
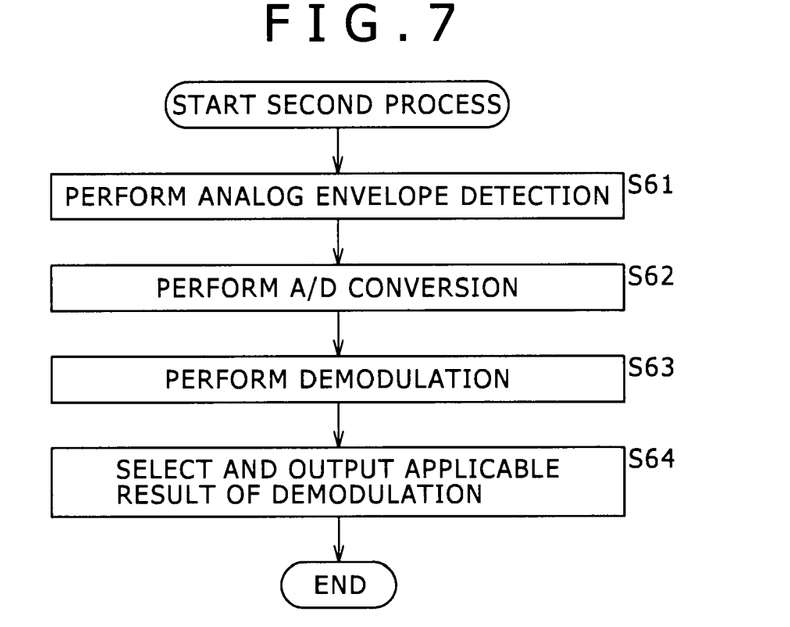
FIG. 7 is a flowchart explanatory of a detailed example of a second process included in FIG. 5.

The second process in step S24 of FIG. 5 is explained below in detail by referring to the flowchart of FIG. 7. In step S61, the analog envelope detector 102b envelope-detects the signal s1 so as to detect an amplitude change. At this point, the analog envelope detector 102b outputs its amplitude change signal as the signal s4. At the same time, the analog orthogonal detector 102a subjects the signal s1 to analog orthogonal detection.

In step S62, the A/D converter 103c A/D-converts the signal s4 output as a result of the processing in step S61. The A/D converter 103c thus generates the signal s7 as a digital signal.

In step S63, the digital demodulator 104c performs demodulation based on the signal s7. The digital demodulator 104c then outputs the signal s11 as the result of the demodulation.

In step S64, the output selection block 105 selects the result of the demodulation, i.e., signal s11, and outputs the selected signal as the signal s8. This is how the second process is carried out.

Returning to FIG. 5, if in step S23 the result of the type estimation is determined to be other than Type A (e.g., Type B), then control is passed on to step S25. In step S25, a third process is carried out.

Figure 8:
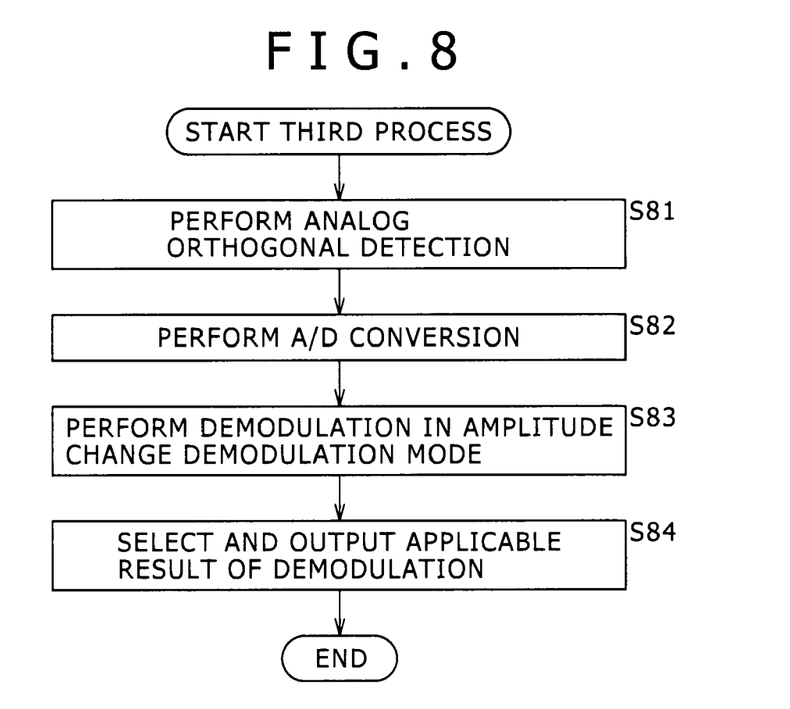
FIG. 8 is a flowchart explanatory of detailed example of a third process included in FIG. 5.

The third process in step S25 of FIG. 5 is explained below in detail by referring to the flowchart of FIG. 8. In step S81, the analog orthogonal detector 102a subjects the signal s1 to analog orthogonal detection. At this point, the analog orthogonal detector 102a phase-detects the supplied signal and outputs its phase change signal as the signals s2 and s3. At the same time, the analog envelope detector 102b envelope-detects the signal s1 so as to detect an amplitude change.

In step S82, the A/D converters 103a and 103b A/D-convert the signals s2 and 3, respectively, which are output as a result of the processing in step S81. The A/D conversion thus generates the signals s5 and s6 as digital signals.

In step S83, the digital demodulator 104a performs demodulation in amplitude change demodulation mode based on the signal s5. The digital demodulator 104a outputs the signal s10 as the result of the demodulation.

In step S84, the output selection block 105 selects the result of the demodulation, i.e., signal s10, and outputs the selected signal as the signal s8. This is how the third process is carried out.

The demodulation process of the demodulation function block 100 according to the invention is performed as described above. When the demodulation function block 100 operates in reader/writer mode in the manner explained above, the first process is always carried out so that demodulation may be effected in phase change demodulation mode on the basis of analog orthogonal detection. This makes it possible to resolve the problem of the null state.

Also, the demodulation carried out as described above avoids having the demodulation scheme selected illustratively by detecting the magnitude of amplitude of the signal s1. This helps enhance the accuracy of demodulation independent of the reception environment.

In the foregoing description, either Type A or Type B of ISO/IEC 14443 was shown to be determined as the result of the type estimation. However, this is not limitative of the present invention. Alternatively, the communication scheme stipulated by, say, ISO/IEC 18092 may be included in the category of the communication schemes other than Type A. That communication scheme may be called Type C.

The degree of modulation with Type C is stipulated to range from 8 to 30 percent. That means the degree of modulation of the transmitted signal ASK-modulated by the reader/writer is not sufficiently high. Illustratively, there is a possibility that an amplitude change of the transmitted signal may be falsely detected typically due to the presence of noise. Thus if the result of the type estimation is determined to be Type C, the third process may also be carried as with the case of Type B.

Furthermore, the result of the type estimation is not limited to Type A, Type B, or Type C. The point is that whether or not the degree of modulation of the transmitted signal ASK-modulated by the reader/writer is sufficiently high need only be determined in advance.

In the foregoing description, the analog orthogonal detector 102a and analog envelope detector 102b were shown to be in use. However, this is not limitative of the present invention. Alternatively, other detectors may be utilized. The point is that phase change and amplitude change need only be detected properly.

Figure 9:
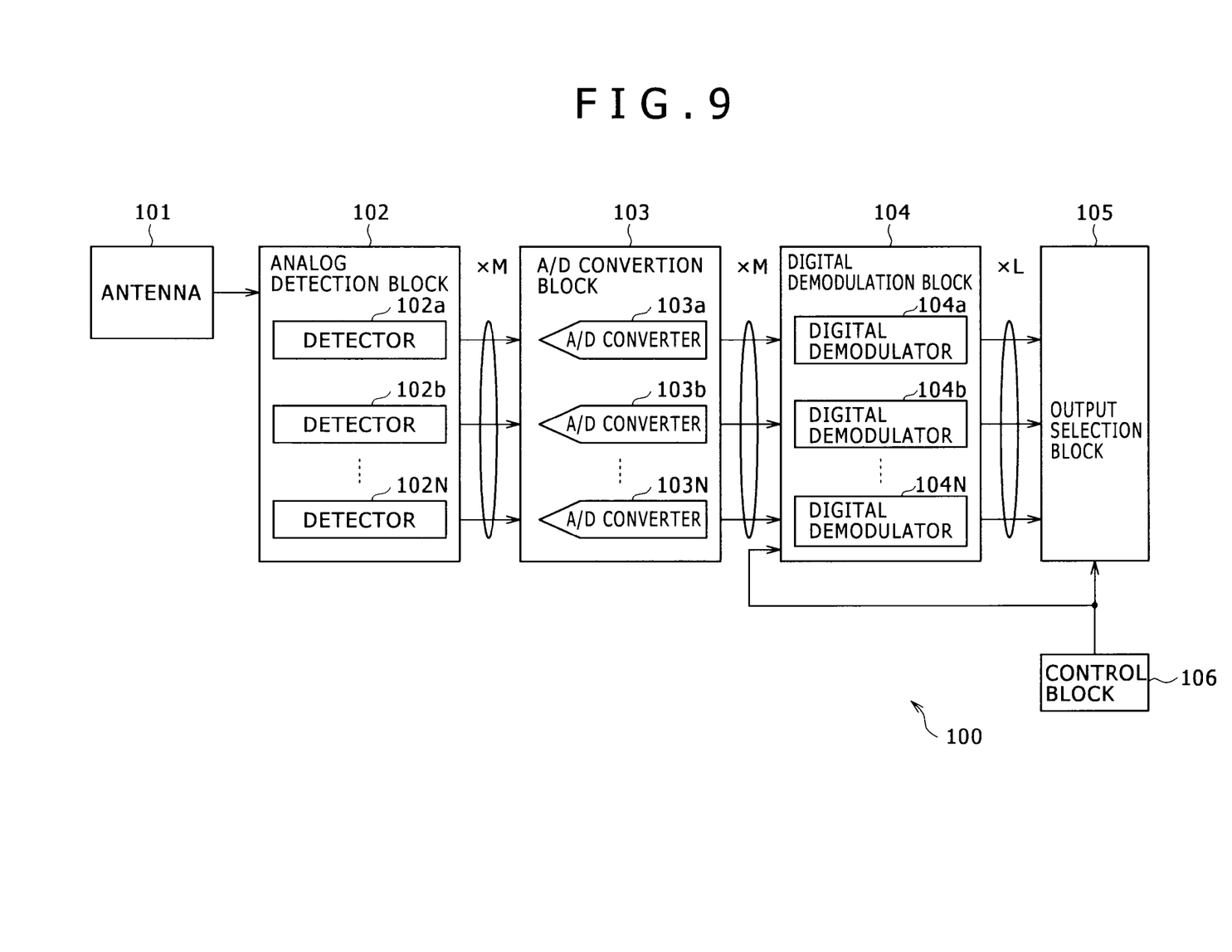
FIG. 9 is a block diagram showing a more generalized structure of the demodulation function block found in FIG. 3.

FIG. 9 is a block diagram showing a more generalized structure of the demodulation function block 100 found in FIG. 3. In the example of FIG. 9, the demodulation function block 100 is made up of an antenna 101, an analog detection block 102, an A/D conversion block 103, a digital demodulation block 104, an output selection block 105, and a control block 106.

The analog detection block 102 includes detectors 102a through 102N. The detectors 102a through 102N are each an independent detector such as an analog orthogonal detector, an analog envelope detector, or the like.

A total of M signal lines are connected to each of the detectors. These signal lines are in turn connected to the A/D converters 103a through 103M of the A/D conversion block 103, respectively. It is assumed that different detectors each output a different number of signals through a different number of signal lines connected therewith. Illustratively, the detector 102a outputs two detection signals; the detector 102b outputs one detection signal; and so on. The A/D converters 103a through 103M are each designed to A/D-convert the supplied signal and forward the converted signal to the digital demodulation block 104.

The digital demodulation block 104 is structured to include digital demodulators 104a through 104L. The digital demodulators 104a through 104L are each an independent demodulator such as a demodulator performing its demodulation based on phase change, a demodulator performing its demodulation based on amplitude change, or the like.

It is assumed that different digital demodulators each input a different number of signals through a different number of signal lines connected therewith. Illustratively, the digital demodulator 104a inputs two signals; the digital demodulator 104b inputs one signal; and so on. The digital demodulators 104a through 104L are designed to supply the output selection block 105 with as many as L signals that are output as a result of the demodulation performed by each of these digital demodulators 104a through 104L.

The output selection block 105 selects one of the signals output by the digital demodulators 104a through 104L, and outputs the selected signal.

The control block 106 outputs control signals for operating the digital demodulators 104a through 104L. The control block 106 further outputs control signals for determining the signal to be output by the output selection block 105.

It is thus possible for the demodulation function block 100 of the present invention to be generalized in its structure as outlined above.

In the foregoing description, the demodulation function block 100 was shown to operate as part of the reader/writer or as part of the noncontact IC card. However, this is not limitative of the present invention. Alternatively, this invention may be implemented as long as one communicating device transmits an ASK-modulated carrier while the other communicating device load-modulates the carrier before transmitting the modulated carrier.

In this specification, the series of steps or processes described above includes not only the processes that are to be carried out in the depicted sequence (i.e., on a time series basis) but also processes that may be performed parallelly or individually and not necessarily chronologically.

It should be understood by those skilled in the art that various modifications, combinations, sub-combinations and alterations may occur depending on design requirements and other factor in so far as they are within the scope of the appended claims or the equivalents thereof.

The present application contains subject matter related to that disclosed in Japanese Priority Patent Application JP 2009-240054 filed in the Japan Patent Office on Oct. 19, 2009, the entire content of which is hereby incorporated by reference.

What is claimed is:

1. A demodulation apparatus comprising:
    operation determination means for determining whether said demodulation apparatus operates as part of either a first device or a second device with which said demodulation apparatus communicates, said first device being configured to amplitude shift keying (ASK) modulate and transmit data, said second device being configured to load-modulate and transmit data;
    first demodulation control means configured such that if said demodulation apparatus is determined to operate as part of said first device, then said first demodulation control means detects a phase change of a transmitted signal generated by said second device on the basis of an in-phase signal and an orthogonal signal obtained by orthogonally detecting said transmitted signal, said first demodulation control means further demodulating data sent from said second device on the basis of the detected phase change; and
    second demodulation control means configured such that if said demodulation apparatus is determined to operate as part of said second device and if the communication scheme of said first device is estimated to be a predetermined communication scheme, then said second demodulation control means detects an amplitude change of a transmitted signal generated by said first device on the basis of a detection signal obtained by envelope-detecting said transmitted signal, said second demodulation control means further demodulating data sent from said second device on the basis of the detected amplitude change.

2. The demodulation apparatus according to claim 1, wherein, if said demodulation apparatus is determined to operate as part of said second device and if the communication scheme of said first device is estimated to be other than said predetermined communication scheme, then said first demodulation control means detects the amplitude change of said transmitted signal on the basis of either said in-phase signal or said orthogonal signal, said first demodulation control means further demodulating the data sent from said second device on the basis of the detected amplitude change.

3. The demodulation apparatus according to claim 2, wherein said first demodulation control means includes:
    orthogonal detection means for outputting said in-phase signal and said orthogonal signal obtained by orthogonally detecting said transmitted signal;
    analog/digital conversion means for outputting two digital signals by analog/digital-converting said in-phase signal and said orthogonal signal; and
    first digital demodulation means for demodulating the data sent from said second device on the basis of said two digital signals; and
    said second demodulation control means includes
    envelope detection means for outputting said detection signal obtained by envelope-detecting said transmitted signal;
    analog/digital conversion means for outputting a digital signal by analog/digital-converting said detection signal; and
    second digital demodulation means for demodulating the data sent from said second device on the basis of said digital signal.

4. The demodulation apparatus according to claim 1, wherein said predetermined demodulation scheme is the Type A communication standard stipulated by ISO/IEC 14443.

5. A demodulation method for use with a demodulation apparatus including operation determination means, first demodulation control means and second demodulation control means, said demodulation method comprising the steps of:
   causing said operation determination means to determine whether said demodulation apparatus operates as part of either a first device or a second device with which said demodulation apparatus communicates, said first device being configured to amplitude shift keying (ASK) modulate and transmit data, said second device being configured to load-modulate and transmit data;
   if said demodulation apparatus is determined to operate as part of said first device, then causing said first demodulation control means to detect a phase change of a transmitted signal generated by said second device on the basis of an in-phase signal and an orthogonal signal obtained by orthogonally detecting said transmitted signal, said first demodulation control means being further caused to demodulate data sent from said second device on the basis of the detected phase change; and
   if said demodulation apparatus is determined to operate as part of said second device and if the communication scheme of said first device is estimated to be a predetermined communication scheme, then causing said second demodulation control means to detect an amplitude change of a transmitted signal generated by said first device on the basis of a detection signal obtained by envelope-detecting said transmitted signal, said second demodulation control means being further caused to demodulate data sent from said second device on the basis of the detected amplitude change.

6. An electronic device comprising a demodulation apparatus that includes:
   operation determination means for determining whether said demodulation apparatus operates as part of either a first device or a second device with which said demodulation apparatus communicates, said first device being configured to amplitude shift keying (ASK) modulate and transmit data, said second device being configured to load-modulate and transmit data;
   first demodulation control means configured such that if said demodulation apparatus is determined to operate as part of said first device, then said first demodulation control means detects a phase change of a transmitted signal generated by said second device on the basis of an in-phase signal and an orthogonal signal obtained by orthogonally detecting said transmitted signal, said first demodulation control means further demodulating data sent from said second device on the basis of the detected phase change; and
   second demodulation control means configured such that if said demodulation apparatus is determined to operate as part of said second device and if the communication scheme of said first device is estimated to be a predetermined communication scheme, then said second demodulation control means detects an amplitude change of a transmitted signal generated by said first device on the basis of a detection signal obtained by envelope-detecting said transmitted signal, said second demodulation control means further demodulating data sent from said second device on the basis of the detected amplitude change;
   wherein said electronic device demodulates a transmitted signal from another device using said demodulation apparatus.

7. A demodulation apparatus comprising:
   an operation determination block configured to determine whether said demodulation apparatus operates as part of either a first device or a second device with which said demodulation apparatus communicates, said first device being configured to amplitude shift keying (ASK) modulate and transmit data, said second device being configured to load-modulate and transmit data;
   a first demodulation control block configured such that if said demodulation apparatus is determined to operate as part of said first device, then said first demodulation control block detects a phase change of a transmitted signal generated by said second device on the basis of an in-phase signal and an orthogonal signal obtained by orthogonally detecting said transmitted signal, said first demodulation control block further demodulating data sent from said second device on the basis of the detected phase change; and
   a second demodulation control block configured such that if said demodulation apparatus is determined to operate as part of said second device and if the communication scheme of said first device is estimated to be a predetermined communication scheme, then said second demodulation control block detects an amplitude change of a transmitted signal generated by said first device on the basis of a detection signal obtained by envelope-detecting said transmitted signal, said second demodulation control block further demodulating data sent from said second device on the basis of the detected amplitude change.

8. An electronic device comprising a demodulation apparatus that includes:
   an operation determination block configured to determine whether said demodulation apparatus operates as part of either a first device or a second device with which said demodulation apparatus communicates, said first device being a5 configured to amplitude shift keying (ASK) modulate and transmit data, said second device being configured to load-modulate and transmit data;
   a first demodulation control block configured such that if said demodulation apparatus is determined to operate as part of said first device, then said first demodulation control block detects a phase change of a transmitted signal generated by said second device on the basis of an in-phase signal and an orthogonal signal obtained by orthogonally detecting said transmitted signal, said first demodulation control block further demodulating data sent from said second device on the basis of the detected phase change; and
   a second demodulation control block configured such that if said demodulation apparatus is determined to operate as part of said second device and if the communication scheme of said first device is estimated to be a predetermined communication scheme, then said second demodulation control block detects an amplitude change of a transmitted signal generated by said first device on the basis of a detection signal obtained by envelope-detecting said transmitted signal, said second demodulation control block further demodulating data sent from said second device on the basis of the detected amplitude change;
   wherein said electronic device demodulates a transmitted signal from another device using said demodulation apparatus.

* * * * *